(12) United States Patent
Connell, II et al.

(10) Patent No.: US 11,620,887 B2
(45) Date of Patent: Apr. 4, 2023

(54) GUNSHOT DETECTION SYSTEM WITH MASTER SLAVE TIMING ARCHITECTURE

(71) Applicant: JOHNSON CONTROLS FIRE PROTECTION LP, Boca Raton, FL (US)

(72) Inventors: Thomas Wysong Connell, II, Westminster, MA (US); Alan Levin, III, Bolton, MA (US)

(73) Assignee: Johnson Controls Fire Protection LP, Boca Raton, FL (US)

( * ) Notice: Subject to any disclaimer, the term of this patent is extended or adjusted under 35 U.S.C. 154(b) by 0 days.

(21) Appl. No.: 16/968,932

(22) PCT Filed: Feb. 14, 2019

(86) PCT No.: PCT/IB2019/051203
§ 371 (c)(1),
(2) Date: Aug. 11, 2020

(87) PCT Pub. No.: WO2019/159099
PCT Pub. Date: Aug. 22, 2019

(65) Prior Publication Data
US 2021/0049880 A1 Feb. 18, 2021

Related U.S. Application Data

(60) Provisional application No. 62/637,161, filed on Mar. 1, 2018, provisional application No. 62/631,296, filed on Feb. 15, 2018.

(51) Int. Cl.
G08B 13/16 (2006.01)
G08B 17/06 (2006.01)
(Continued)

(52) U.S. Cl.
CPC ......... G08B 13/1672 (2013.01); G06F 16/61 (2019.01); G06F 21/602 (2013.01);
(Continued)

(58) Field of Classification Search
None
See application file for complete search history.

(56) References Cited

U.S. PATENT DOCUMENTS 4,709,330 A 11/1987 Yokoi et al.
5,504,717 A 4/1996 Sharkey et al.
(Continued)

FOREIGN PATENT DOCUMENTS

CN 102 843 205 B 12/2012
EP 1 806 952 A2 7/2007
(Continued)

OTHER PUBLICATIONS

International Search Report and Written Opinion of the International Searching Authority, dated Jun. 18, 2019, from International Application No. PCT/IB2019/051202, filed on Feb. 14, 2019. 24 pages. (WO1).

(Continued)

*Primary Examiner* — Fekadeselassie Girma
(74) *Attorney, Agent, or Firm* — HoustonHogle LLP

(57) ABSTRACT

A gunshot detection system synchronizes timing information across gunshot sensor units and/or a control panel. The gunshot sensor units exchange timing information with each other and/or with the control panel, which is then used by the gunshot sensor units to generate the event data for detected gunshot events. In one embodiment, the gunshot sensor units are configured as master and slave nodes. The master node periodically distributes a master time reference to the slave nodes, and the slave nodes calibrate local times based on the master time reference. The slave nodes can detect whether (Continued)

the current master node has become non-functional (e.g. based on a time elapsed since the most recently sent master time reference) and configure a new master node based on exchanging predetermined priority information for the slave nodes.

20 Claims, 8 Drawing Sheets

(51) Int. Cl.
```
G08B 25/10      (2006.01)
G08B 25/14      (2006.01)
H04L 41/06      (2022.01)
G08B 17/00      (2006.01)
G08B 29/18      (2006.01)
G08B 29/24      (2006.01)
G06F 16/61      (2019.01)
H04W 12/037     (2021.01)
G06F 21/60      (2013.01)
G06Q 50/26      (2012.01)
H04L 9/08       (2006.01)
H04L 9/14       (2006.01)
H04W 56/00      (2009.01)
G08B 19/00      (2006.01)
G08B 25/04      (2006.01)
G07C 9/00       (2020.01)
G08B 7/06       (2006.01)
G08B 25/01      (2006.01)
H04W 4/029      (2018.01)
H04W 4/38       (2018.01)
H04W 4/90       (2018.01)
H04W 84/18      (2009.01)
H04W 84/20      (2009.01)
```
(52) U.S. Cl.
CPC ....... *G06Q 50/265* (2013.01); *G07C 9/00182* (2013.01); *G08B 7/066* (2013.01); *G08B 17/00* (2013.01); *G08B 17/06* (2013.01); *G08B 19/00* (2013.01); *G08B 25/014* (2013.01); *G08B 25/04* (2013.01); *G08B 25/10* (2013.01); *G08B 25/14* (2013.01); *G08B 29/188* (2013.01); *G08B 29/24* (2013.01); *H04L 9/0894* (2013.01); *H04L 9/14* (2013.01); *H04L 41/06* (2013.01); *H04W 4/029* (2018.02); *H04W 4/38* (2018.02); *H04W 4/90* (2018.02); *H04W 12/037* (2021.01); *H04W 56/0015* (2013.01); *H04W 84/18* (2013.01); *H04W 84/20* (2013.01)

(56) References Cited

U.S. PATENT DOCUMENTS

| | | | |
|---|---|---|---|
| 5,973,998 A | 10/1999 | Showen et al. | |
| 6,552,963 B2 | 4/2003 | Baranek et al. | |
| 6,970,183 B1 | 11/2005 | Monroe | |
| 7,228,429 B2 | 6/2007 | Monroe | |
| 7,411,865 B2 | 8/2008 | Calhoun | |
| 7,460,006 B2 | 12/2008 | Kates | |
| 7,676,194 B2 | 3/2010 | Rappaport | |
| 7,843,356 B2 | 11/2010 | Webb | |
| 7,986,231 B1 | 7/2011 | Bentley et al. | |
| 8,149,649 B1 | 4/2012 | Brinn et al. | |
| 8,589,994 B2 | 11/2013 | Monroe | |
| 8,806,632 B2 | 8/2014 | Stefanidakis et al. | |
| 9,432,720 B2 | 8/2016 | Kruglick | |
| 9,642,131 B2 | 5/2017 | Bohlander et al. | |
| 9,672,700 B2 | 6/2017 | Lax | |
| 9,672,727 B1 | 6/2017 | Alexander et al. | |
| 9,679,459 B2 | 6/2017 | Crowe | |
| 9,830,932 B1 | 11/2017 | Gunderson et al. | |
| 9,875,643 B1 | 1/2018 | Sarna, II | |
| 9,888,371 B1 | 2/2018 | Jacob | |
| 10,089,845 B2 | 10/2018 | Skorpik et al. | |
| 10,102,732 B2 | 10/2018 | Gersten | |
| 10,586,109 B1 | 3/2020 | Fowler et al. | |
| 10,657,800 B1 | 5/2020 | Fowler et al. | |
| 10,741,058 B1 | 8/2020 | Miller | |
| 10,928,244 B2 | 2/2021 | Warren et al. | |
| 11,133,021 B2 | 9/2021 | Davis et al. | |
| 11,170,619 B2 | 11/2021 | Connell, II et al. | |
| 11,282,536 B2 | 3/2022 | Davis et al. | |
| 2006/0109113 A1 | 5/2006 | Reyes et al. | |
| 2008/0165621 A1 | 7/2008 | Fisher et al. | |
| 2009/0222241 A1* | 9/2009 | Dorogi | G01R 31/44 702/182 |
| 2010/0142715 A1 | 6/2010 | Goldstein et al. | |
| 2010/0271905 A1 | 10/2010 | Khan et al. | |
| 2010/0305778 A1 | 12/2010 | Dorneich et al. | |
| 2011/0169633 A1 | 7/2011 | Lauder et al. | |
| 2014/0218518 A1 | 8/2014 | Oliver | |
| 2014/0222943 A1* | 8/2014 | Oleson | A61B 5/7214 709/208 |
| 2014/0269199 A1 | 9/2014 | Weldon et al. | |
| 2014/0277609 A1 | 9/2014 | Nye et al. | |
| 2014/0327543 A1 | 11/2014 | Showen et al. | |
| 2014/0340222 A1 | 11/2014 | Thornton et al. | |
| 2015/0061869 A1 | 3/2015 | Crowe et al. | |
| 2015/0070166 A1 | 3/2015 | Boyden et al. | |
| 2015/0077550 A1* | 3/2015 | Apelbaum | G06K 9/6289 348/143 |
| 2015/0339913 A1 | 11/2015 | Lyman et al. | |
| 2015/0347079 A1* | 12/2015 | Price | G08B 25/016 700/94 |
| 2016/0232774 A1 | 8/2016 | Noland et al. | |
| 2016/0260307 A1 | 9/2016 | Skorpik et al. | |
| 2016/0269397 A1 | 9/2016 | Camenisch et al. | |
| 2016/0379456 A1 | 12/2016 | Nongpiur et al. | |
| 2017/0019264 A1 | 1/2017 | Nugent et al. | |
| 2017/0045336 A1 | 2/2017 | Crowe et al. | |
| 2017/0069190 A1 | 3/2017 | Hansen et al. | |
| 2017/0103643 A1 | 4/2017 | Powers, III et al. | |
| 2017/0169686 A1 | 6/2017 | Skorpik et al. | |
| 2017/0289650 A1 | 10/2017 | Schattmaier et al. | |
| 2017/0301220 A1 | 10/2017 | Jarrell et al. | |
| 2018/0053394 A1 | 2/2018 | Gersten | |
| 2018/0122030 A1 | 5/2018 | Raz et al. | |
| 2018/0160278 A1* | 6/2018 | Patel | G08B 27/001 |
| 2018/0199179 A1 | 7/2018 | Rauner | |
| 2018/0308475 A1* | 10/2018 | Locke | G06N 5/02 |
| 2019/0024918 A1 | 1/2019 | Brissette et al. | |
| 2019/0130723 A1 | 5/2019 | Thiel et al. | |
| 2019/0213901 A1 | 7/2019 | Kur et al. | |
| 2019/0347920 A1 | 11/2019 | Anderson et al. | |
| 2021/0049880 A1* | 2/2021 | Connell, II | G08B 29/24 |
| 2021/0158837 A1 | 5/2021 | Saki et al. | |
| 2021/0202067 A1* | 7/2021 | Williams | A61B 5/0022 |

FOREIGN PATENT DOCUMENTS

| | | | |
|---|---|---|---|
| EP | 3032508 A1 * | 6/2016 | ............ H04N 7/181 |
| JP | 2001236822 A | 8/2001 | |
| JP | 4973380 B2 * | 7/2012 | |
| JP | 2017520831 A * | 7/2017 | ............ G08G 1/081 |
| WO | WO 9110980 | 7/1991 | |
| WO | WO 2010039130 | 4/2010 | |
| WO | WO 2010111556 | 9/2010 | |
| WO | WO 2011134371 | 11/2011 | |
| WO | WO 2012092562 | 7/2012 | |
| WO | WO 2017070741 | 5/2017 | |
| WO | WO 2017122119 | 7/2017 | |
| WO | WO 2018044553 | 3/2018 | |
| WO | WO 2018044556 | 3/2018 | |
| WO | WO 2018185723 | 10/2018 | |
| WO | WO 2019159098 | 8/2019 | |
| WO | WO 2019159100 | 8/2019 | |
| WO | WO 2019159101 | 8/2019 | |

(56) References Cited

FOREIGN PATENT DOCUMENTS

| WO | WO 2019159102 | 8/2019 |
|----|---------------|--------|
| WO | WO 2019159103 | 8/2019 |
| WO | WO 2019159104 | 8/2019 |
| WO | WO 2019159105 | 8/2019 |
| WO | WO 2019159106 | 8/2019 |

OTHER PUBLICATIONS

International Search Report and Written Opinion of the International Searching Authority, dated May 21, 2019, from International Application No. PCT/IB2019/051203, filed on Feb. 14, 2019. 13 pages. (WO2).
International Search Report and Written Opinion of the International Searching Authority, dated May 14, 2019, from International Application No. PCT/IB2019/051204, filed on Feb. 14, 2019. 15 pages. (WO3).
International Search Report and Written Opinion of the International Searching Authority, dated Jul. 12, 2019, from International Application No. PCT/IB2019/051205, filed on Feb. 14, 2019. 23 pages. (WO4).
International Search Report and Written Opinion of the International Searching Authority, dated Jun. 12, 2019, from International Application No. PCT/IB2019/051206, filed on Feb. 14, 2019. 13 pages. (WO5).
International Search Report and Written Opinion of the International Searching Authority, dated Jun. 14, 2019, from International Application No. PCT/IB2019/051207, filed on Feb. 14, 2019. 13 pages. (WO6).
International Search Report and Written Opinion of the International Searching Authority, dated May 31, 2019, from International Application No. PCT/IB2019/051208, filed on Feb. 14, 2019. 18 pages. (WO7).
International Search Report and Written Opinion of the International Searching Authority, dated Jul. 23, 2019, from International Application No. PCT/IB2019/051209, filed on Feb. 14, 2019. 20 pages. (WO8).
International Search Report and Written Opinion of the International Searching Authority, dated May 24, 2019, from International Application No. PCT/IB2019/051210, filed on Feb. 14, 2019. 15 pages. (WO9).
Partial Search Report dated Apr. 24, 2019, from International Application No. PCT/IB2019/051202, filed on Feb. 14, 2019. 14 pages. (WO1).
Partial Search Report dated May 17, 2019, from International Application No. PCT/IB2019/051205, filed on Feb. 14, 2019. 13 pages. (WO4).
Partial Search Report dated May 31, 2019, from International Application No. PCT/IB2019/051209, filed on Feb. 14, 2019. 12 pages. (WO8).
International Preliminary Report on Patentability dated Aug. 27, 2020 from International Application No. PCT/IB2019/051202, filed on Feb. 14, 2019. 14 pages. (WO1).
International Preliminary Report on Patentability dated Aug. 27, 2020, from International Application No. PCT/IB2019/051203, filed on Feb. 14, 2019. 7 pages. (WO2).
International Preliminary Report on Patentability dated Aug. 27, 2020, from International Application No. PCT/IB2019/051204, filed on Feb. 14, 2019. 9 pages. (WO3).
International Preliminary Report on Patentability dated Aug. 27, 2020, from International Application No. PCT/IB2019/051205, filed on Feb. 14, 2019. 23 pages. (WO4).
International Preliminary Report on Patentability dated Aug. 27, 2020, from International Application No. PCT/IB2019/051206, filed on Feb. 14, 2019. 8 pages. (WO5).
International Preliminary Report on Patentability dated Aug. 27, 2020, from International Application No. PCT/IB2019/051207, filed on Feb. 14, 2019. 8 pages. (WO6).
International Preliminary Report on Patentability dated Aug. 27, 2020, from International Application No. PCT/IB2019/051208, filed on Feb. 14, 2019. 12 pages. (WO7).
International Preliminary Report on Patentability dated Aug. 27, 2020, from International Application No. PCT/IB2019/051209, filed on Feb. 14, 2019. 12 pages. (WO8).
International Preliminary Report on Patentability dated Aug. 27, 2020, from International Application No. PCT/IB2019/051210, filed on Feb. 14, 2019. 9 pages. (WO9).
Examination Report dated Oct. 10, 2022 from EP Application No. 19 707 130.1, filed on Feb. 14, 2019. 7 pages. (EP1).
Examination Report dated Nov. 2, 2022, from EP Application No. 19 711 166.9, filed on Feb. 14, 2019. 10 pages. (EP2).
Examination Report dated Oct. 26, 2022, from EP Application No. 19 711 167.7, filed on Feb. 14, 2019. 9 pages. (EP3).
Examination Report dated Oct. 14, 2022, from EP Application No. 19 710 785.7, filed on Feb. 14, 2019. 9 pages. (EP4).
Examination Report dated Oct. 21, 2022, from EP Application No. 19 711 419.2, filed on Feb. 14, 2019. 9 pages. (EP6).
Examination Report dated Oct. 20, 2022, from EP Application No. 19 711 420.0, filed on Feb. 14, 2019. 9 pages. (EP7).
Examination Report dated Oct. 14, 2022, from EP Application No. 19 711 168.5, filed on Feb. 14, 2019. 6 pages. (EP8).
Examination Report dated Oct. 25, 2022, from EP Application No. 19 710 786.5, filed on Feb. 14, 2019. 9 pages. (EP9).
McIntire, J., et al., "AFRL Commander's Challenge 2015: Stopping the Active Shooter," Proceedings of SPIE, 10184: 101840E1-101840E14 (2017).

* cited by examiner

GUNSHOT DETECTION SYSTEM WITH MASTER SLAVE TIMING ARCHITECTURE

RELATED APPLICATIONS

This application is a § 371 National Phase Application of International Application No. PCT/IB2019/051203, filed on Feb. 14, 2019, which claims the benefit under 35 USC 119(e) of U.S. Provisional Application No. 62/631,296, filed on Feb. 15, 2018, and U.S. Provisional Application No. 62/637,161, filed on Mar. 1, 2018, all of which are incorporated herein by reference in their entirety.

This application is related to:

International Application number PCT/IB2019/051202 filed Feb. 14, 2019, entitled "Gunshot detection system with forensic data retention, live audio monitoring, and two-way communication," now International Patent Publication No.: WO 2019/159098;

International Application number PCT/IB2019/051204 filed Feb. 14, 2019, entitled "Gunshot detection system with encrypted, wireless transmission," now International Patent Publication No.: WO 2019/159100;

International Application number PCT/IB2019/051205 filed on Feb. 14, 2019, entitled "Gunshot detection system with building management system integration," now International Patent Publication No.: WO 2019/159101;

International Application number PCT/IB2019/051206 filed on Feb. 14, 2019, entitled "Gunshot detection system anti-tampering protection," now International Patent Publication No.: WO 2019/159102;

International Application number PCT/IB2019/051207 filed on Feb. 14, 2019, entitled "Gunshot detection system with ambient noise modeling and monitoring," now International Patent Publication No.: WO 2019/159103;

International Application number PCT/IB2019/051208 filed on Feb. 14, 2019, entitled "Gunshot detection system with fire alarm system integration," now International Patent Publication No.: WO 2019/159104;

International Application number PCT/IB2019/051209 filed on Feb. 14, 2019, entitled "Gunshot detection sensors incorporated into building management devices," now International Patent Publication No.: WO 2019/159105; and International Application number PCT/IB2019/051210 filed on Feb. 14, 2019, entitled "Gunshot detection system with location tracking," now International Patent Publication No.: WO 2019/159106.

All of the afore-mentioned applications are incorporated herein by this reference in their entirety.

BACKGROUND OF THE INVENTION

Shooting incidents, involving active shooters shooting victims within buildings such as schools or malls, are increasingly a concern. Identifying and reacting quickly to such incidents can reduce loss of life. For example, first responders need to know if gunshots have actually been fired and the location and number of the fired shots.

In confined areas, such as in a school or a private or public building, detecting and locating the source of gunshots is a complicated problem. A gunshot typically generates several sounds including the gunshot itself, the bullet's bow shockwave, noise from bullet impacts and noise of reflected gunshot sounds. In addition, numerous noises are generated in buildings that may be mistakenly identified as gunshots.

The broad concept of detecting gunshots utilizing acoustics is known. More specifically, it is known to provide a gunshot detection system including an array of acoustic sensors positioned in a pattern which enables signals from the sensors to be employed to not only detect the firing of a gunshot but to also locate the origin of the shot. One main requirement of such a system is the need to accurately distinguish between the sound produced from a gunshot and a host of other ambient sounds. In at least one known arrangement, a microphone is used to detect each sound, which is then amplified, converted to an electrical signal and then the electrical signal is compared with a threshold value above which a gunshot sound is expected to exceed.

Recently, gunshot detection systems with improved accuracy, dependability, and effectiveness have been described. One such system is described in International Publication Number WO 2018/044553, published on Mar. 8, 2018 and entitled "System and Method for Acoustically Identifying Gunshots Fired Indoors." This system provides for low false alarms or false positives and high detection rates by employing two microelectromechanical microphones (MEMs) having different sensitivity levels. Acoustic signals from a first microphone with lower sensitivity (for example, making the anomaly detection microphone essentially deaf to routine sounds) are first analyzed for a peak amplitude level large enough to be a potential gunshot. Then acoustic signals from a second microphone having a higher sensitivity are then analyzed further to confirm that the sound was a gunshot.

Gunshot detection methods have also been proposed that can count the number of gunshots fired, particularly from an automatic or fast acting weapon. One such method is described in International Publication Number WO 2018/044556, published on Mar. 8, 2018 and entitled "Method for Acoustically Counting Gunshots Fired Indoors." In this method, an acoustic signature of captured noise is analyzed to accurately count how many shots are fired. The method can be employed to identify that the gun is an automatic or rapid fire weapon, which information can be provided to emergency personnel.

Additionally, gunshot detection system that can accurately determine where sensed events are located have been proposed. One such system is described in International Publication Number WO 2018/185723, published on Oct. 11, 2018 and entitled "System and Method for Identifying and Locating Sensed Events." Here, a sensor network is employed to detect an event in the form of an audible signal. The event is time stamped and sent to a controller, which evaluates the event as either unique or a multiple detection using the sensor's time of alarm to determine which sensor activated first and to suppress subsequent alarms for the same event. This process is known as de-confliction.

SUMMARY OF THE INVENTION

It is important to ensure synchronized timing across devices of the gunshot detection system. In current systems, the control panel acts as the master time keeper and ensures that the gunshot sensor units keep their timing synchronized. This is important in the deconfliction process. The control panel determines which of the gunshot sensor units is closest to the gunshot based on which of the gunshot sensor units heard the gunshot first period.

According to the present invention, a gunshot detection system is proposed in which gunshot sensor units and possibly a control panel are implemented as nodes of a distributed gunshot detection system. The nodes continuously monitor the other nodes for changes in the topology of the system. One node at any given time is a master timing unit (MTU) reference node. All other nodes operate as slave nodes that receive a master timing reference from the MTU reference node, and report their event data using time relative to the master time. In this way, the possibly of "clock drift" among the sensors as in existing gunshot detection systems is eliminated, and the complexity associated with timekeeping is minimized. The distributed nature of the proposed gunshot detection system also provides fault tolerance among the nodes, where other nodes can take over as the MTU reference node when the current MTU reference node fails, and the sensors also continue to operate when the control panel fails or without any control panel at all.

In general, according to one aspect, the invention features a system for detecting gunshots within a premises. The system includes a communication network and gunshot sensor units for detecting gunshots. Each of the gunshot sensor units comprises a controller for exchanging timing information with other gunshot sensor units over the communication network and generating event information for gunshot detection events based on the timing information.

In embodiments, the gunshot detection system might also include a control panel for controlling the gunshot sensor units and receiving the event data from the gunshot sensor units, and the gunshot sensor units might also exchange the timing information with the control panel. The gunshot sensor units could be configured as master and slave nodes (e.g. based on instructions from the control panel or based on predetermined priority information, which might be broadcast by the gunshot sensor units during an initial configuration process and/or after a current master node becomes non-functional and/or under operator control or configuration). In the event that a current master node becomes non-functional, one of the gunshot sensor nodes will become a master node. The master node periodically sends updated timing information to the slave nodes.

The timing information might include a master time reference indicating a time, and the event information might indicate an amount of time elapsed since the time indicated by the master time reference. The gunshot sensor units can also calibrate local times maintained by the gunshot sensor units based on the timing information. In another example, the gunshot sensor units further comprise external clock receivers and antennas, which receive broadcast timing information from an external source.

In general, according to another aspect, the invention features a method for detecting gunshots within a premises. Gunshot sensor units of a gunshot detection system exchange timing information with other gunshot sensor units over a communication network, and the gunshot sensor units detect gunshots and generate event information for gunshot detection events based on the timing information.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
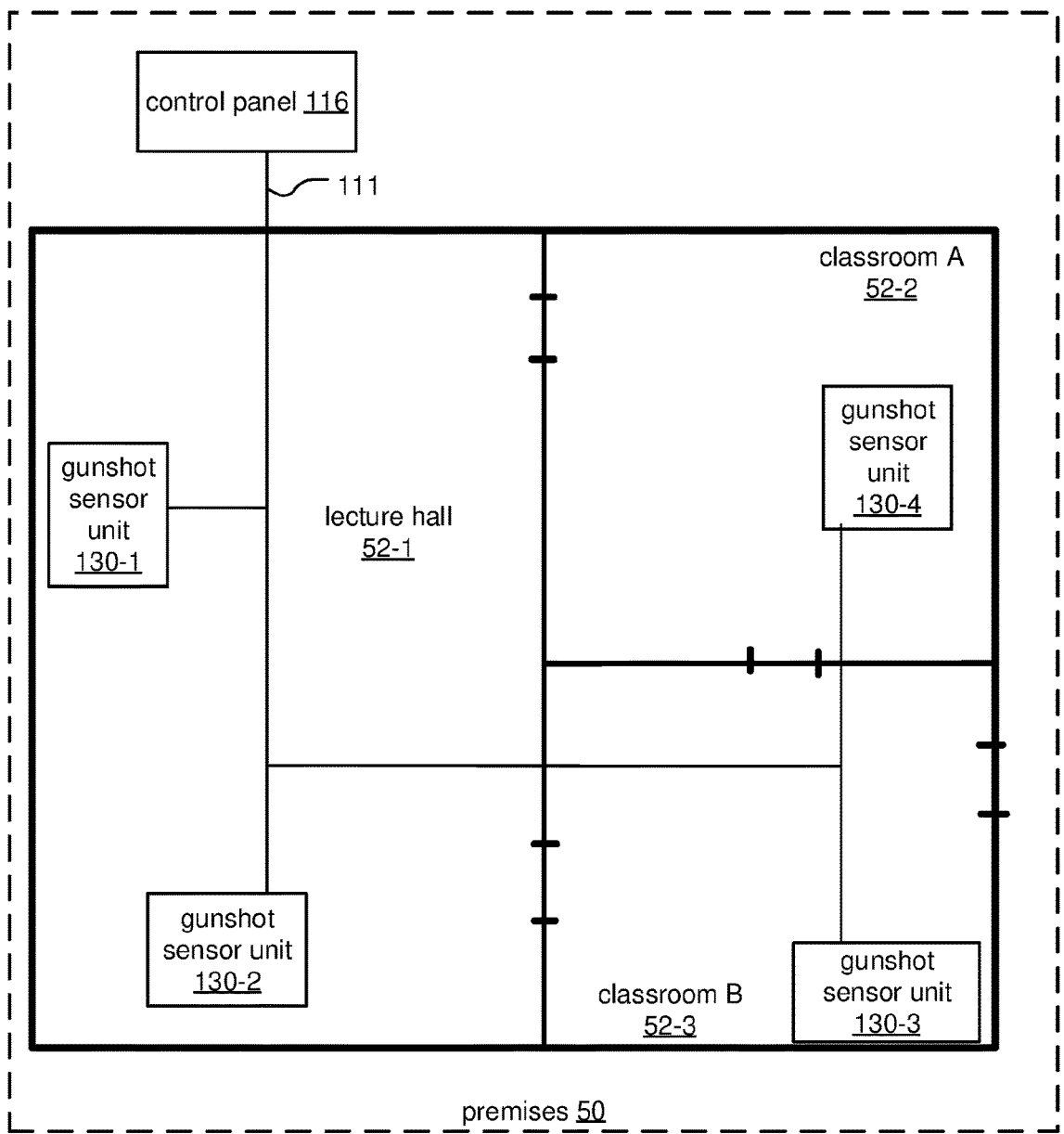
FIG. 1 is a schematic diagram of an exemplary gunshot detection system showing a common context for embodiments of the present invention.

FIG. 1 is a schematic diagram of an exemplary gunshot detection system 100.

In general, the gunshot detection system 100 monitors, detects and reports the occurrence of gunshots or other emergencies within a premises 50 such as a building (e.g. office, hospital, warehouse, retail establishment, shopping mall, school, multi-unit dwelling, government building).

In the illustrated example, the premises 50 is a simplified floor example of a building with three areas 52, a lecture hall 52-1, classroom A 52-2, and classroom B 52-3. Two gunshot sensor units 130-1, 130-2 are located in the lecture hall 52-1, while one gunshot sensor unit 130-2 is located in classroom A 52-2, and one gunshot sensor unit 130-3 is located in classroom B 52-3.

In the illustrated embodiment, the gunshot detection system 100 includes gunshot sensor units 130, a control panel 116, and a communication network 111. In general, and in one configuration, the gunshot sensor units 130 detect conditions indicative of the gunshots or other emergencies and alert the control panel 116, which takes one or more responsive actions such as alerting building personnel, law enforcement, and/or a monitoring center, or collecting and presenting data pertaining to the detected gunshots to an operator of the control panel 116. The gunshot sensor units 130 and the control panel 116 communicate over the communication network 111.

More specifically, the gunshot sensor units 130 are distributed throughout the premises 50, for example, in areas 52 of the premises such as rooms, hallways, lobbies or stairways, to name a few examples. The gunshot sensor units 130 detect acoustic anomalies indicating potential gunshots and generate audio data depicting the acoustic anomalies. The gunshot sensor units 130 also generate event data based on and descriptive of the acoustic anomalies and locally store and/or send the event data to the control panel 116.

The event data often includes: audio data (e.g. digitized audio clips) depicting the acoustic anomalies and metadata. This metadata includes, for example, time information indicating when the acoustic anomalies started and/or stopped, duration information for the acoustic anomalies and/or the audio data depicting the acoustic anomalies, file information, and identification information for the gunshot sensor unit 130 that detected the anomaly; and other sensor data generated by the gunshot sensor unit.

On the other hand, the control panel 116 directs the overall functionality of the gunshot detection system 100 by sending instructions (e.g. control messages) to be executed by the gunshot sensor units 130, receiving the event data from the gunshot sensor units 130 and taking the responsive actions based on the event data. The control panel 116 might receive preliminary event data (e.g. metadata indicating time and date information) from multiple gunshot sensor units 130 and perform a de-confliction process in order to determine which event data from the different sensor units 130 pertains to the same detected acoustic anomaly and which of the gunshot sensor units 130 is closest to the source of the acoustic anomaly based on, for example, which of the units first detected the acoustic anomaly. The control panel 116 might then send instructions to the gunshot sensor unit 130 closest to the source to send full event data (e.g. including a full audio data sample, environmental data, and other sensor data) to the control panel 116 for further processing and/or to be presented to the operator.

For various reasons, it is important for the event data to include accurate and precise time and date information. For example, the de-confliction process performed by the control panel 116 involves determining which event data received from gunshot sensor units 130 pertain to the same acoustic anomalies (e.g. gunshots), which gunshot sensor unit 130 was the first to detect the acoustic anomalies and thus which gunshot sensor unit 130 is closest to the source of the acoustic anomalies. In another example, it is useful to provide event data with accurate time and date information, for example, to law enforcement entities investigating gunshot events.

In general, according to the present invention, the gunshot sensor units 130 exchange timing information with each other and/or with the control panel 116 over the communication network 111 in order to synchronize timing across the devices 130, 116. This timing information is then used by the gunshot sensor units 130 to generate the event data. In one embodiment, the gunshot sensor units 130 are configured as master and slave nodes. The master node can be either the control panel 116 or one of the gunshot sensor units 130. The master node periodically distributes a master time reference to the slave nodes, and the slave nodes calibrate local times based on the master time reference.

The slave nodes also determine whether the master node has become non-operational (e.g. based on whether an update timer since the most recently received master time reference has expired) and, if so, a new master node is configured based, for example, on predetermined priority information for the slave nodes.

Figure 2A:
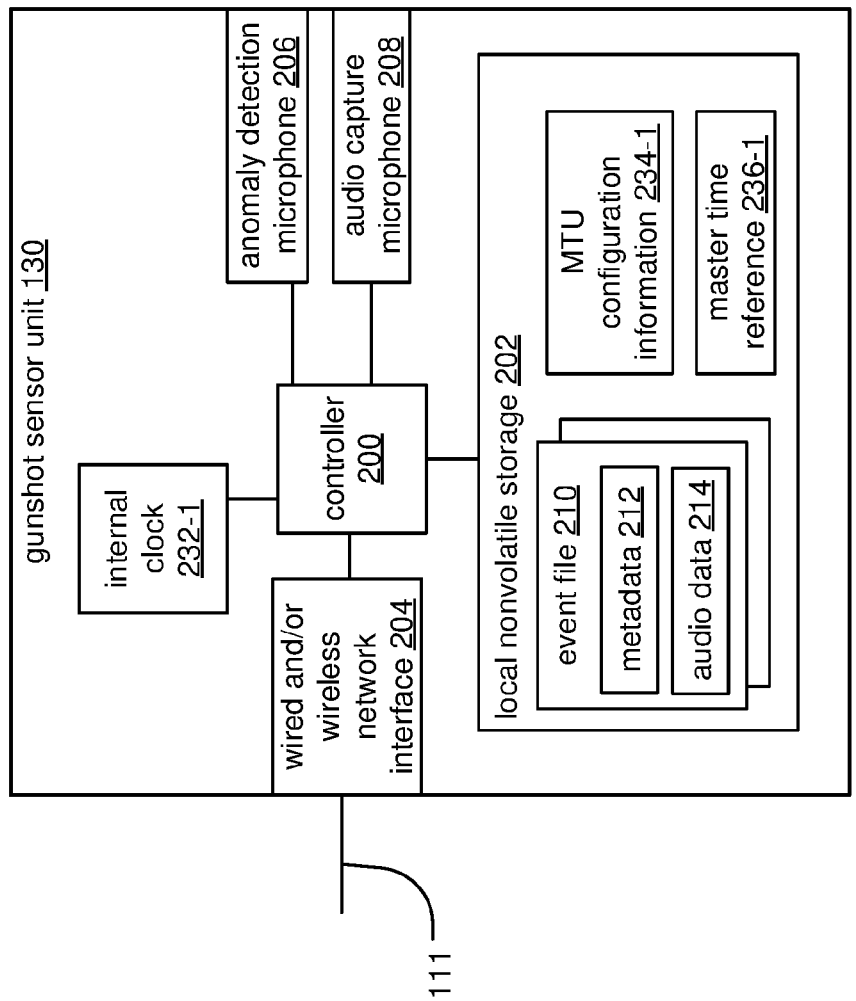
FIG. 2A is a block diagram showing an exemplary gunshot sensor unit of the gunshot detection system according to the present invention.

FIG. 2A is a block diagram showing an exemplary gunshot sensor unit 130.

The gunshot sensor unit 130 includes a controller 200, local nonvolatile storage 202, a wired and/or wireless network interface 204, an anomaly detection microphone 206, an audio capture microphone 208.

The controller 200 executes firmware/operating system instructions and generally directs the functionality of the gunshot sensor unit 130. In one example, the controller 200 is small single-board computer. In other examples, the controller is a microcontroller unit or a system on a chip (SoC), including one or more processor cores along with memory and programmable input/output peripherals such as analog to digital converts and digital to analog converters.

The wired and/or wireless network interface 204 provides connectivity with the control panel 116 and possibly other devices via the communication network 111. In addition, the network also provides power to the devices, in many examples. Direct current (DC) is superimposed upon the data that is transmitted between the devices and other nodes on the network.

The anomaly detection microphone 206 detects the acoustic anomalies, while the audio capture microphone 208 captures ambient sound and generates the audio data. In one embodiment, both microphones 206, 208 are micro electromechanical system (MEMS) microphones having different sensitivity levels, and the controller 200 is configured to sample the microphones 206, 208 such that outputs from the microphones can be continuously analyzed in near real time for an acoustic signature. The anomaly detection microphone 206 has the lower sensitivity level and a high clipping level, while the audio capture microphone 208 has the higher sensitivity level. The audio capture microphone 208 continuously captures ambient sound, which is stored in a 9.9 second (for example) loop in a ring buffer of the controller 200. At the same time, incoming acoustic signals from the anomaly detection microphone 206 are continuously analyzed to detect acoustic anomalies, particularly by searching the incoming acoustic signal for a peak amplitude level large enough to be at least preliminarily identified as a gunshot.

Once an indication of a possible gunshot has been triggered utilizing the anomaly detection microphone 208, further processing may be performed by the controller 200. The controller 200 analyzes the sound stored in the loop to confirm that the acoustic anomaly is a gunshot. If confirmed as gunshot, the controller stores the captured sound stored in the loop buffer 216, which would include the acoustic anomaly and the previously captured sound (up to 9.9 seconds, in this example) as audio data 214 in the local nonvolatile storage 202 associated with different event files 210 or instances of event data for different gunshot detection events, along with the metadata 212, which includes the time and/or data information for the events. In embodiments, the local nonvolatile storage 202 could be fixed storage such as flash memory, or removable storage such as an SD card, among other examples.

The internal clock 232-1 of the gunshot sensor unit 130 maintains a local time for the gunshot sensor unit 130. In general, internal clocks 232 may be a microchip including a crystal that vibrates at a set frequency when electricity is applied to it. The internal clock 232 is used to regulate timing of functions performed, for example, by a processor. The gunshot sensor unit 130 generates the event data based in part on the local time maintained by its internal clock 232-1.

However, as previously mentioned, the gunshot sensor units 130 also generate the event data based on timing information exchanged between the gunshot sensor units 130 and/or the control panel 116. More specifically, each gunshot sensor unit 130 stores in the local nonvolatile storage 202 a local copy of the master time reference 236-1. If the gunshot sensor unit 130 is a slave node, the local copy of the master time reference 236-1 is based on the master time reference sent from the master node at periodic intervals.

In one example, the master time reference indicates a local time at which the master node generated the master time reference (e.g. based on the local time maintained by the internal clock 232 of the master node). If the gunshot sensor unit 130 is a master node (for example, in a situation wherein the previous master node became non-functional), the gunshot sensor node 130 generates the master time reference based on the local time maintained by its own internal clock 232-1, stores a local copy of the master time reference 236-1 in the local nonvolatile storage 202, and distributes the master time reference to the slave nodes.

In another example, the master time reference is only relative time rather than actual time. That is the master time references is not based on any outside time reference but is simply a local system time.

The gunshot sensor units 130 also store master timing unit (MTU) configuration information 234-1. In one example, the MTU configuration information 234 includes priority information, which is used by the gunshot sensor units 130 and/or the control panel 116 to configure a master node during an initial configuration process (e.g. after initial installation of the gunshot detection system 100 before a master node has been configured) or when the current master node becomes non-functional. The priority information of the MTU configuration information 234 might include a numerical priority value indicating the gunshot sensor node's 130 or control panel's 116 priority with respect to the other devices. The MTU configuration information 234 also includes a current local status (e.g. master node or slave node) which determines the functionality of the device and might change during operation of the gunshot detection system 100. In another example, the MTU configuration information 234 might simply indicate a static master node and/or static slave nodes, whose status as master or slave nodes do not change during operation of the gunshot detection system 100. The MTU configuration information 234 also includes update interval information indicating a predetermined time interval for distributing the updated master time reference and for determining whether the master node has become non-functional.

Figure 2B:
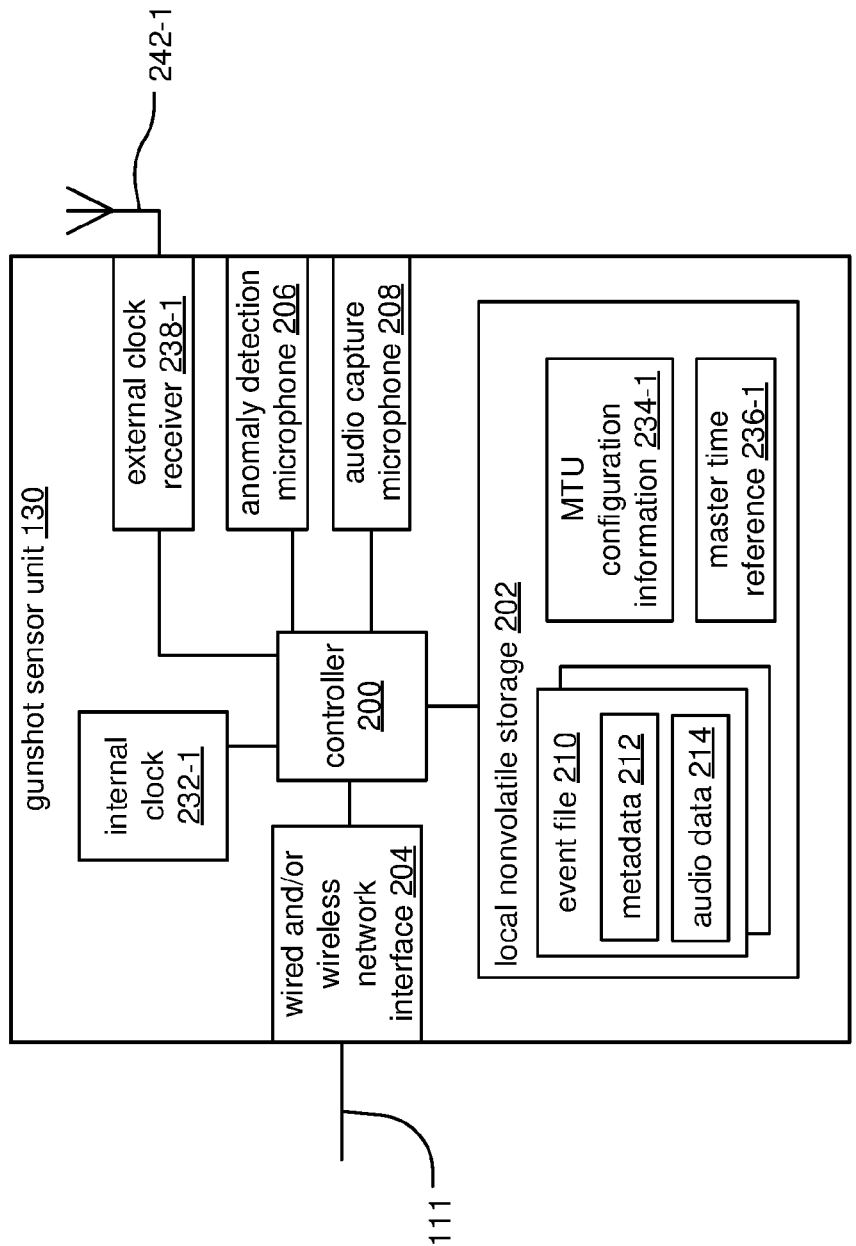
FIG. 2B is a block diagram showing an exemplary gunshot sensor unit according to another embodiment of the present invention in which the gunshot sensor unit includes an external clock receiver.

FIG. 2B is a block diagram showing an exemplary gunshot sensor unit 130 according to another embodiment of the present invention. Here, the gunshot sensor unit 130 includes an external clock receiver 238-1 connected to an external clock antenna 242-1. In general, the external clock receiver 238 wirelessly receives via the external clock antenna 242 timing information broadcast from an external source such as a 4G cellular tower or from a global navigation satellite system (GNSS) such as the global positioning system (GPS). In this example, the gunshot sensor unit 130 calibrates its local time based on the timing information broadcast from the external source.

Figure 3A:
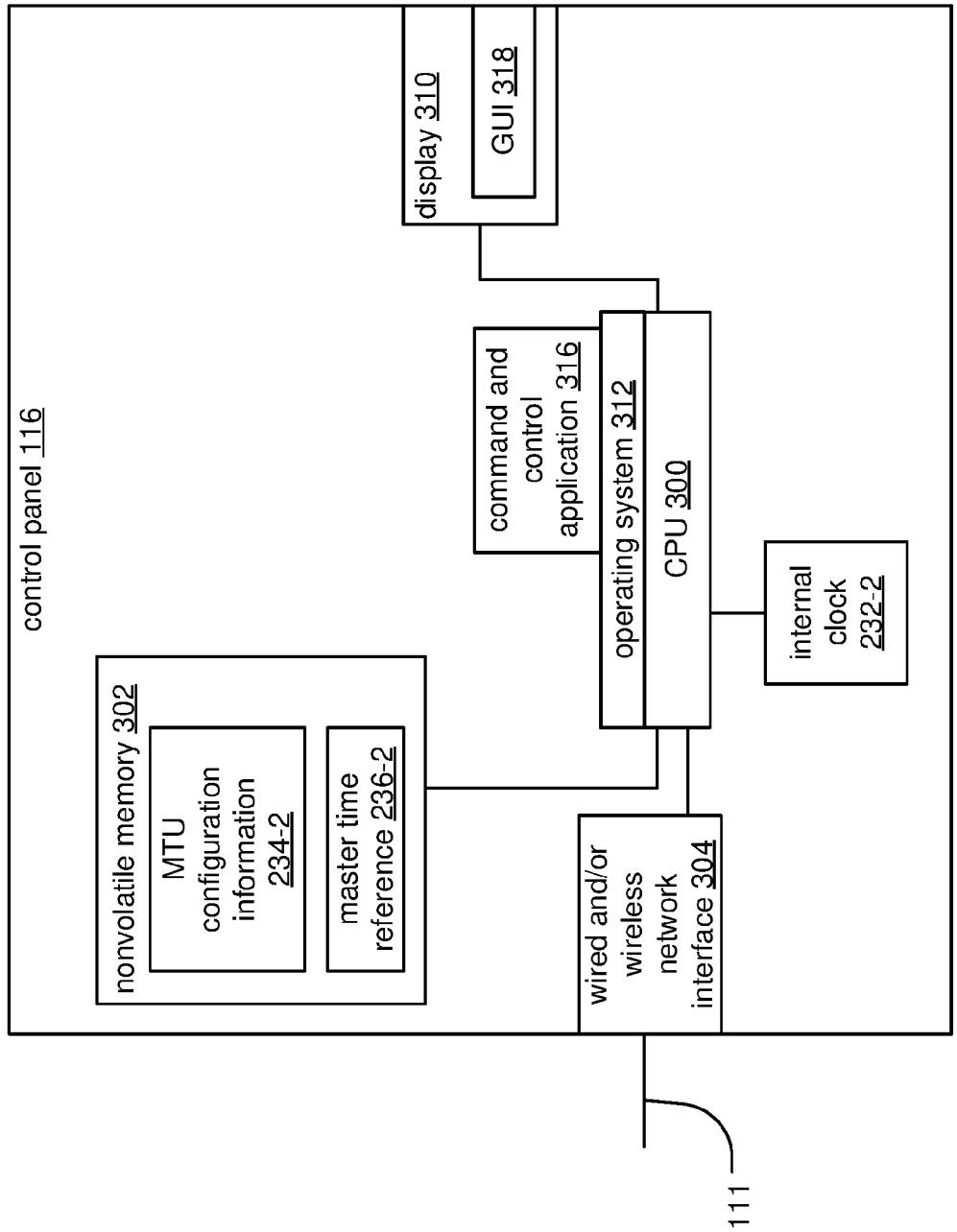
FIG. 3A is a block diagram showing an exemplary control panel of the gunshot detection system according to the present invention.

FIG. 3A is a block diagram showing an exemplary control panel 116.

The control panel 116 includes a central processing unit (CPU) 300, nonvolatile memory 302, a wired and/or wireless network interface 304, and a display 310.

Similar to analogous components on the gunshot sensor units 130, the wired and/or wireless network interface 304 provides connectivity with the gunshot sensor units 130 and possibly other devices via the communication network 111. In some examples, the control panel may also supply power to the units.

The CPU 300 executes firmware instructions and an operating system (OS) 312 and generally directs the functionality of the control panel 116. The OS 312 interfaces with the hardware components of the control panel 116 for access by a command and control application 316, which is a software process executing on top of the OS 312.

The command and control application 316, in general, generates a graphical user interface (GUI) 318 that is rendered on the display 310 (e.g. touchscreen display) of the control panel 116. In one example, the GUI 318 might present gunshot sensor unit information to an operator of the control panel 116 and receives input indicating selections of various options for controlling the gunshot sensor units 130 such as setting the MTU configuration information 232 for the control panel 116 and/or the gunshot sensor units 130. In one example, the command and control application 316 might also be configured to act as the master node by distributing the master time reference to the slave nodes (e.g. the gunshot sensor units 130).

As with the gunshot sensor unit 130, the control panel 116 includes its own internal clock 232-2 and stores in its nonvolatile memory 302 a local copy of the master time reference 236-2 and the MTU configuration information 234-2. The MTU configuration information 234-2 might include priority information not just for the control panel 116 but for all of the gunshot sensor units 130. The internal clock 232-2 of the control panel 116 maintains a local time for the control panel 116, and, when acting as the master node, the control panel 116 generates the master time reference based on the local time maintained by the internal clock 232-2. In one example, the control panel 116 interprets the event data based on the local time maintained by its internal clock 232-2 and/or the local copy of the master time reference 236-2 stored in the nonvolatile memory 302.

Figure 3B:
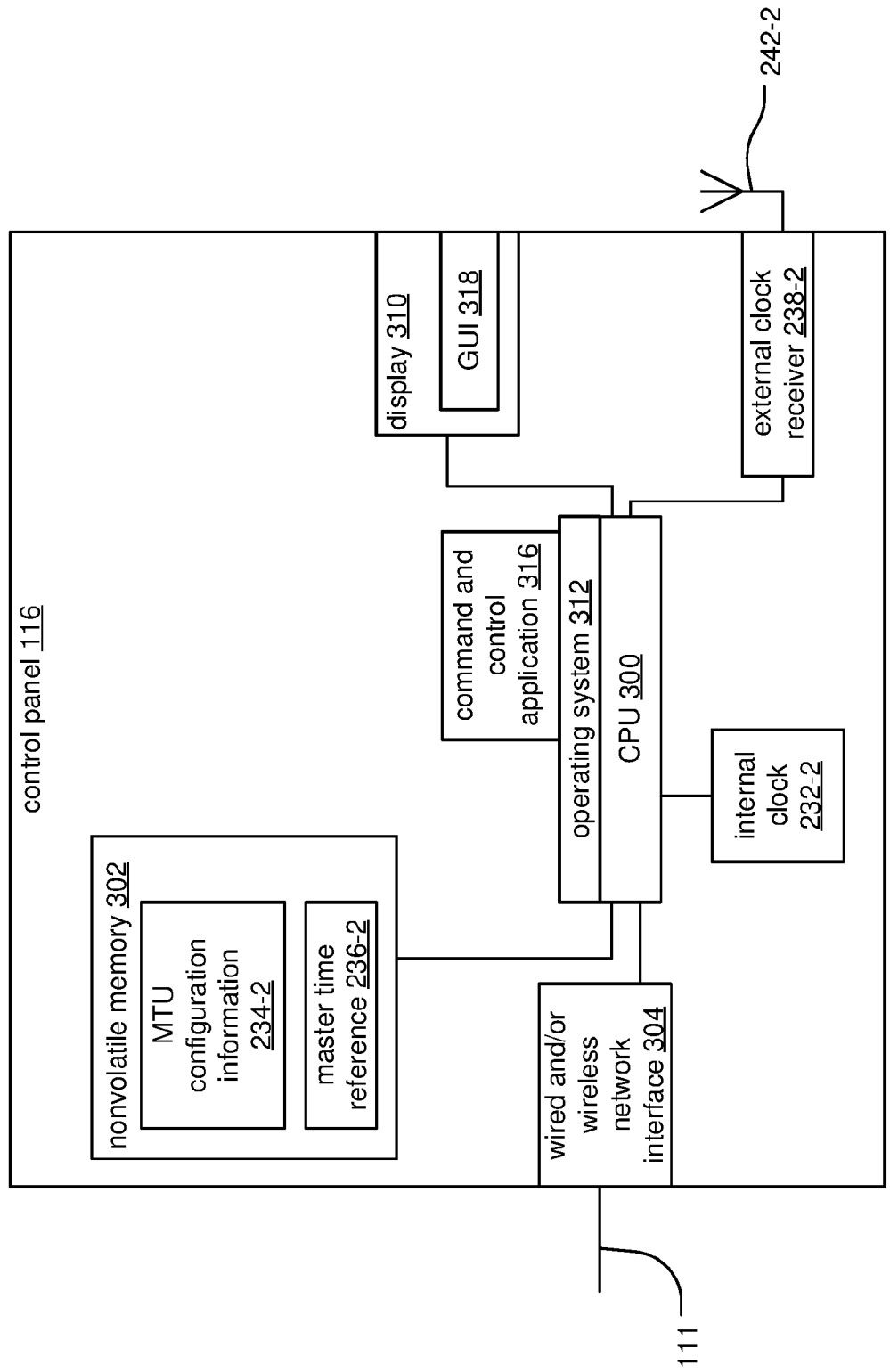
FIG. 3B is a block diagram showing an exemplary control panel according to another embodiment of the present invention in which the control panel includes an external clock receiver.

FIG. 3B is a block diagram showing an exemplary control panel 116 according to another embodiment of the present invention. Here, the control panel 116 includes an external clock receiver 238-2 connected to an external clock antenna 242-2. Similar to the gunshot sensor unit 130 illustrated in FIG. 2B, in this example, the control panel 116 calibrates its local time based on the timing information broadcast from the external source and received via the external clock receiver 238-2 and external clock antenna 242-2.

Figure 4:
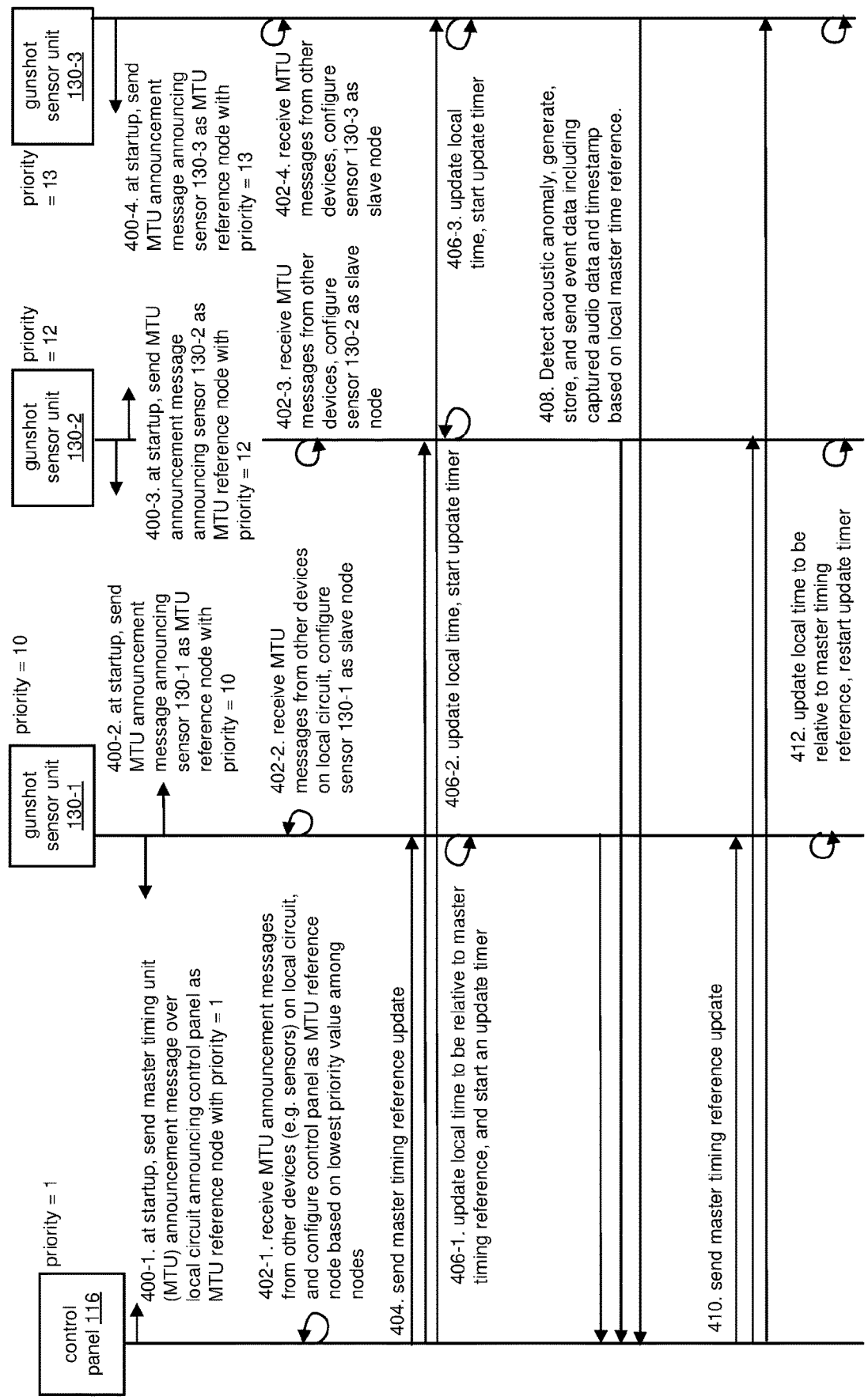
FIG. 4 is a sequence diagram illustrating a process by which the gunshot detection system synchronizes timing information across the control panel and the gunshot sensor units.

FIG. 4 is a sequence diagram illustrating a process by which the gunshot detection system 100 synchronizes timing information across the control panel 116 and the gunshot sensor units 130.

First, in step 400, the control panel 116 and gunshot sensor units 130 perform an initial configuration process, which might be initiated upon first installation and startup of the devices 116, 130. In general, each of the devices 116, 130 broadcasts an MTU announcement message over the communication network 111 announcing priority information (as specified, for example, in the locally stored MTU configuration information 234 for each device). The effect of the MTU announcement message is for each device 116, 130 to declare itself as the master node, or MTU reference node, and to indicate its priority as, for example, a numerical priority value.

The priority information for each node can be set a number of ways. In one example, the priority information is set manually by an operator during installation or configuration by setting DIP (dual in-line package) switches on the bottom of the device's house, for example. In another example, the priority information could be simply a random number generated by each of the nodes. And in still other embodiments, the priority information might be based upon the different capabilities of each of the devices. For example, a device that has a GPS chipset for acquiring time information may have a higher priority than a device that does not. In some embodiments, control panels always have a higher priority values then gunshot sensor units.

In the illustrated example, in step 400-1, the control panel 116, which has a priority value of "1," sends the MTU announcement message announcing the control panel 116 as the MTU reference node with the priority value of "1." Similarly, the gunshot sensor unit 130-1, which has a predetermined priority value of "10," sends the MTU announcement message announcing the gunshot sensor unit 130-1 as the MTU reference node with the priority value of "10," the gunshot sensor unit 130-2, which has a predetermined priority value of "12," sends the MTU announcement message announcing gunshot sensor unit 130-2 as the MTU reference node with the priority value of "12," and the gunshot sensor unit 130-3, which has a predetermined priority value of "13," sends the MTU announcement message announcing gunshot sensor unit 130-3 as the MTU reference node with the priority value of "13." In this scheme, higher priority values are indicated by lower numbers.

In step 402, in general, the control panel 116 and the gunshot sensor units 130 receive the MTU announcement messages from the other devices and determine whether they are master nodes or slave nodes based on their own priority value and the received MTU announcement messages. In one example, the devices 116, 130 might update the local MTU configuration information 234 to indicate the current local master or slave status.

In the illustrated example, in step 402-1 the control panel 116 receives the MTU announcement messages from the gunshot sensor units 130 and determines that the control panel 116 is MTU reference node based on a determination that its own priority value ("1") is the lowest of the received priority values for the gunshot sensor units 130. The control panel 116 updates the locally stored MTU configuration information to indicate that it is the master node.

In step 402-2, the gunshot sensor unit 130-1 receives the MTU announcement messages from the control panel 116 and the other gunshot sensor units 130-2, 130-3 and determines that the gunshot sensor unit 130-1 is a slave node based on a determination that is own priority value ("10") is not the lowest of the received priority values for the control panel 116 and the other gunshot sensor units 130-2, 130-3. The gunshot sensor unit 130-1 updates the locally stored MTU configuration information to indicate that it is a slave node.

In step 402-3, the gunshot sensor unit 130-2 receives the MTU announcement messages from the control panel 116 and the other gunshot sensor units 130-1, 130-3 and determines that the gunshot sensor unit 130-2 is a slave node based on a determination that is own priority value ("12") is not the lowest of the received priority values for the control panel 116 and the other gunshot sensor units 130-1, 130-3. The gunshot sensor unit 130-2 updates the locally stored MTU configuration information to indicate that it is a slave node.

In step 402-4, the gunshot sensor unit 130-3 receives the MTU announcement messages from the control panel 116 and the other gunshot sensor units 130-1, 130-2 and determines that the gunshot sensor unit 130-3 is a slave node based on a determination that is own priority value ("13") is not the lowest of the received priority values for the control panel 116 and the other gunshot sensor units 130-1, 130-2. The gunshot sensor unit 130-3 updates the locally stored MTU configuration information to indicate that it is a slave node.

In step 404, the control panel 116, which is the master node or MTU reference node, generates the master time reference based on the local time maintained by its own internal clock 232-2 and distributes the master time reference to the gunshot sensor units 130-1, 130-2, 130-3.

In step 406, the gunshot sensor units 130 store local copies of the master time reference 236-1 in local nonvolatile storage 202, calibrate the local time maintained by their respective internal clocks 232-1 based on the master time reference, and start an update timer, indicating an amount of time elapsed since the most recent update to the master time reference.

In step 408, the gunshot sensor units 130 detect an acoustic anomaly (e.g. a gunshot) via the anomaly detection microphone 206. Each of the gunshot sensor units 130 generates event data based on the detected acoustic anomaly including audio data captured via the audio capture microphone 208 and time and date information (e.g. a timestamp) based on the master time reference. In one example, the timestamp might be indicated as the master time reference plus the amount of elapsed time since the most recently received master time reference. In another example, the timestamp might be indicated as a current time of day based on the local time maintained by the gunshot sensor unit's 130 internal clock 232-1 and calibrated based on the master time reference.

In step 410, the control panel 116 generates and sends an updated master time reference to the gunshot sensor units 130.

Finally, in step 412, the gunshot sensor units 130 calibrate the local time based on the master time reference and restart the update timer.

Figure 5A:
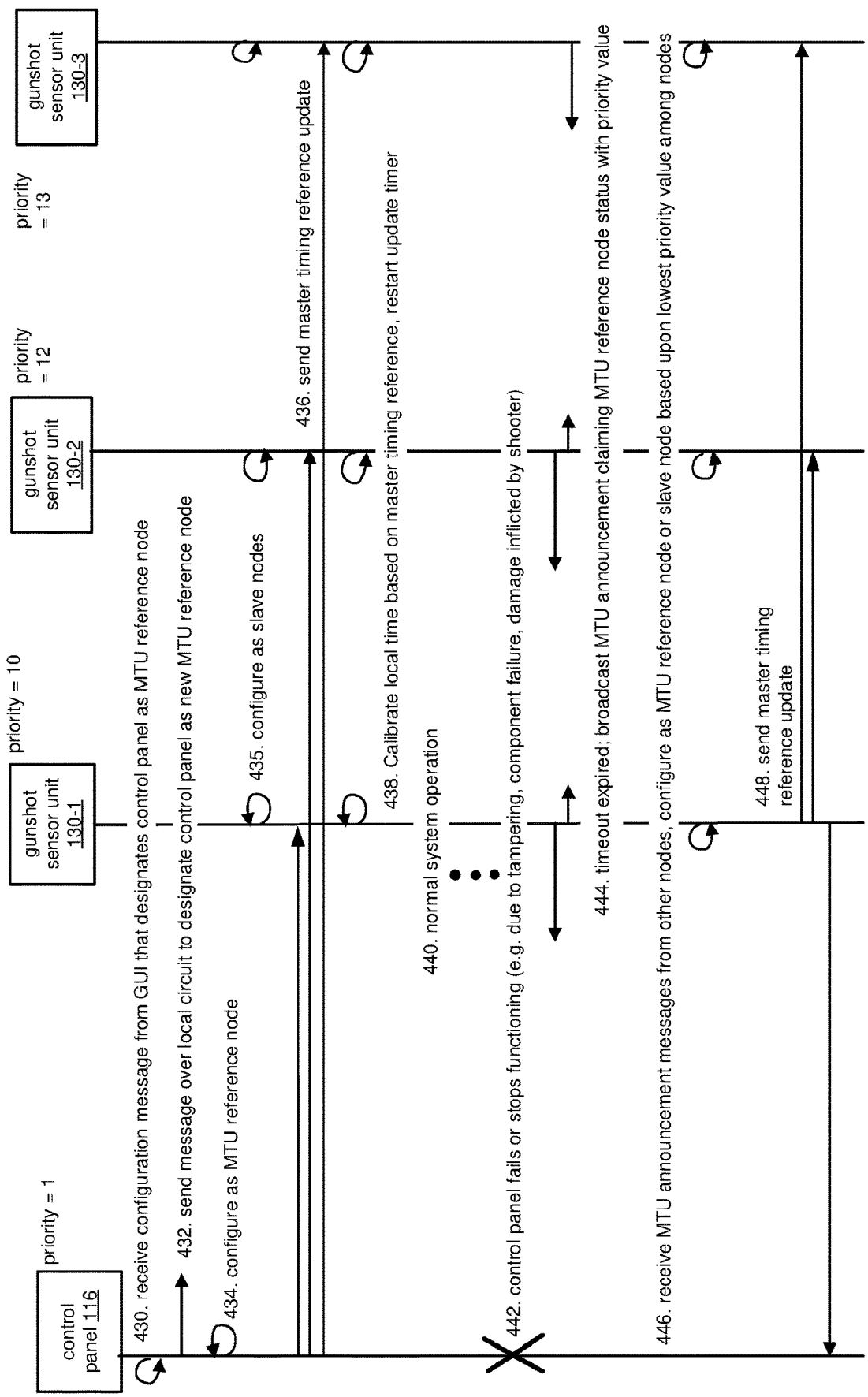
FIG. 5A is a sequence diagram illustrating a process by which the gunshot detection system detects a failure of a control panel functioning as the current master node and configures a new master node.

FIG. 5A is a sequence diagram illustrating a process by which the gunshot detection system 100 detects a failure of the current master node and configures a new master node.

First, in step 430, the control panel 116 receives via the GUI 318 configuration information from an operator of the control panel indicating that the control panel 116 should be the MTU reference node, as would be the typical scenario.

In step 432, the control panel 116 sends control messages via the communication network 111 to the gunshot sensor units 130 designating the control panel 116 as the MTU reference node, and in step 434, the control panel 116 configures itself as the MTU reference node, for example, by updating the node status in the locally stored MTU configuration information 234-2.

In step 435, the gunshot sensor units 130 configure themselves as slave nodes, for example, by updating the node status in the locally stored MTU configuration information 234-1.

In step 436, the control panel 116 generates and sends the master time reference based on the local time maintained by the control panel's 116 internal clock 232-2 and stores a local copy of the master time reference 236-2. In response, in step 438, the gunshot sensor units 130 calibrate the local time maintained by their respective internal clocks 232-1 based on the master time reference, store local copies of the master time reference 236-1, and start or restart the update timer.

In step 440, the system operates as normal for a period of time.

However, in step 442, the control panel 116 fails or stops functioning (e.g. due to tampering, component failure, damage inflicted by a shooter). In this situation, it is no longer possible for the control panel 116 to send the updated master time reference, as expected by the gunshot sensor units 130.

Thus, in step 444, the update timer of the gunshot sensor units 130 expires due to not receiving the updated time from the control panel 116. In one example, this is determined based on the update interval information included in the locally stored MTU configuration information 234-1. In one example, the update interval might be several minutes or longer such as an hour, or more. The gunshot sensor units 130 broadcast the MTU announcement messages claiming the MTU reference node status and indicating the respective priority values for the gunshot sensor units 130.

In step 446, the gunshot sensor units 130 receive the MTU announcement messages sent from the other gunshot sensor units 130 and configure themselves as the master node or a slave node based on their respective priority values and the priority values of the other gunshot sensor units 130. In the illustrated example, the gunshot sensor unit 130-1, having the lowest priority value ("10"), becomes the MTU reference node, while the other gunshot sensor units 130-2, 130-3 become slave nodes.

In step 448, the gunshot sensor unit 130-1, now the MTU reference node, sends the updated master time reference to the other gunshot sensor units 130-2, 130-3.

Figure 5B:
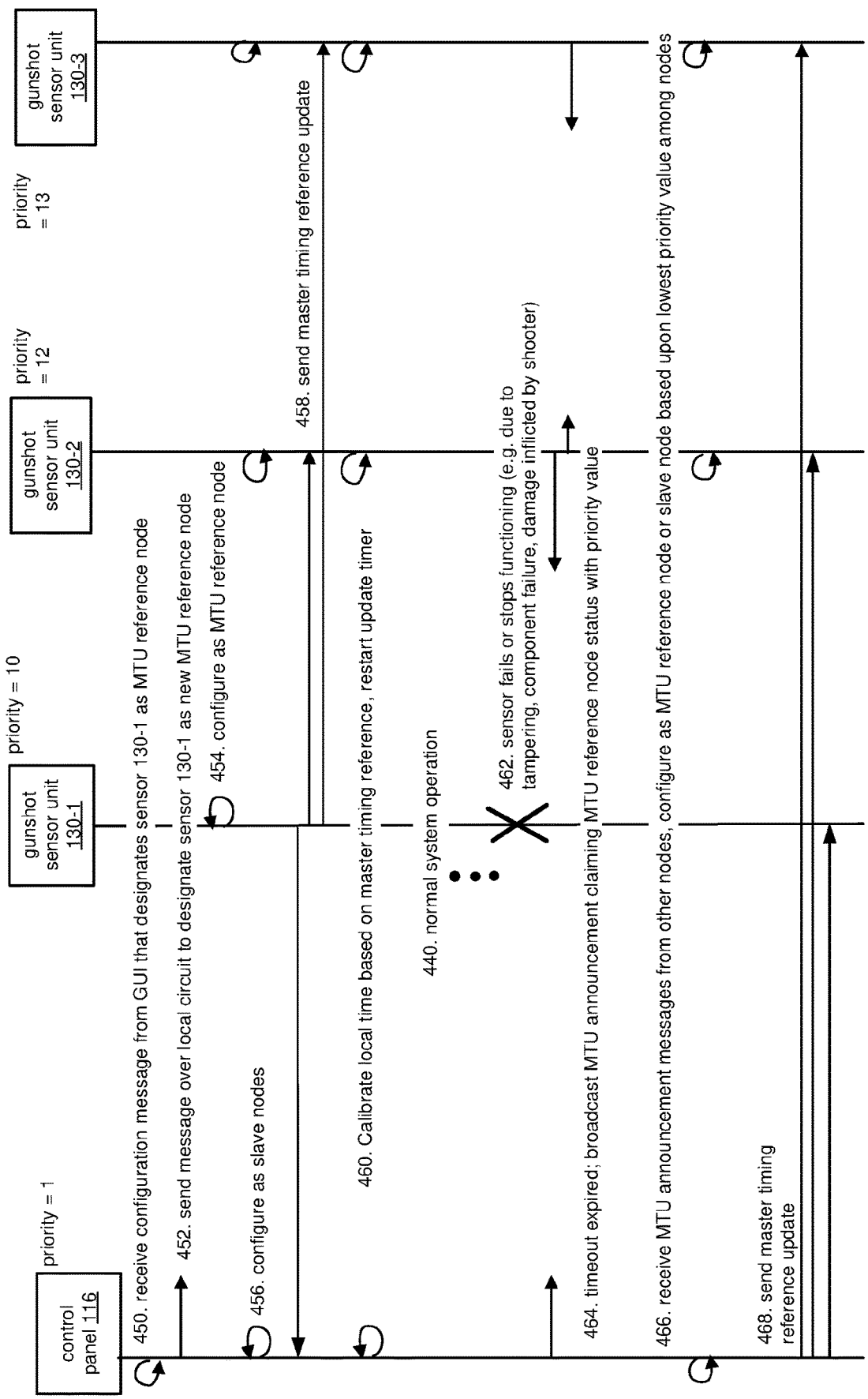
FIG. 5B is a sequence diagram illustrating a process by which the gunshot detection system detects a failure of a gunshot sensor unit functioning as the current master node and configures a new master node.

FIG. 5B is a sequence diagram illustrating another example of the process by which the gunshot detection system 100 detects a failure of the current master node and configures a new master node. In this example, the gunshot sensor unit 130-1 is first designated as the master node, and, upon failure of the gunshot sensor unit 130-1, the control panel 116 assumes the role of the master node.

First, in step 430, the control panel 116 receives via the GUI 318 configuration information from an operator of the control panel 116 indicating that the gunshot sensor unit 130-1 should be the MTU reference node.

In step 452, the control panel 116 sends control messages via the communication network 111 to the gunshot sensor units 130 designating the gunshot sensor unit 130-1 as the MTU reference node, and in step 454, the gunshot sensor unit 130-1 configures itself as the MTU reference node, for example, by updating the node status in the locally stored MTU configuration information 234-1.

In step 456, the control panel 116 and the other gunshot sensor units 130-2, 130-3 configure themselves as slave nodes, for example, by updating the node status in the respective locally stored MTU configuration information 234.

In step 458, the gunshot sensor unit 130-1 generates and sends the master time reference based on the local time maintained by the gunshot sensor unit's 130-1 internal clock 232-1 and stores a local copy of the master time reference 236-1. In response, in step 460, the control panel 116 and the other gunshot sensor units 130-2, 130-3 calibrate the local time maintained by their respective internal clocks 232 based on the master time reference, store local copies of the master time reference 236, and start or restart the update timer.

In step 440, the system operates as normal for a period of time.

However, in step 462, the gunshot sensor unit 130-1 fails or stops functioning (e.g. due to tampering, component failure, damage inflicted by a shooter). In this situation, it is no longer possible for the gunshot sensor unit 130-1 to send the updated master time reference, as expected by the control panel 116 and the other gunshot sensor units 130-2, 130-3.

Thus, in step 464, the update timers of the control panel 116 and the slave node gunshot sensor units 130-2, 130-3 expire due to not receiving the updated time from the master gunshot sensor unit 130-1. The control panel 116 and the slave gunshot sensor units 130-2, 130-3 broadcast the MTU announcement messages claiming the MTU reference node status and indicating the respective priority values.

In step 466, the control panel 116 and the gunshot sensor units 130-2, 130-3 receive the MTU announcement messages and configure themselves as the master node or a slave node based on their respective priority values and the priority values of the other gunshot sensor units 130. In the illustrated example, the control panel 116, having the lowest priority value ("1"), becomes the MTU reference node, while the gunshot sensor units 130-2, 130-3 become slave nodes.

In step 468, the control panel 116, now the MTU reference node, sends the updated master time reference to the slave gunshot sensor units 130-2, 130-3.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for detecting gunshots within a premises, the system comprising:
   a communication network;
   gunshot sensor units for detecting gunshots, each of the gunshot sensor units comprising a controller for exchanging timing information with other gunshot sensor units over the communication network and generating event information for gunshot detection events based on the timing information.

2. The system as claimed in claim 1, further comprising a control panel for controlling the gunshot sensor units and receiving the event data from the gunshot sensor units, wherein the gunshot sensor units exchange the timing information with the control panel.

3. The system as claimed in claim 1, wherein the gunshot sensor units are configured as master and slave nodes with the master node sending the timing information to the slave nodes.

4. The system as claimed in claim 3, wherein the gunshot sensor units are configured as master and slave nodes based on predetermined priority information.

5. The system as claimed in claim 4, wherein the gunshot sensor units broadcast the priority information to the other gunshot sensor units during an initial configuration process and/or after a current master node becomes non-functional.

6. The system as claimed in claim 3, wherein one of the gunshot sensor units will become a master node if a current master nodes becomes non-functional.

7. The system as claimed in claim 3, wherein the master node periodically sends updated timing information to the slave nodes.

8. The system as claimed in claim 3, wherein the timing information includes a master time reference indicating a time, and the event information indicates an amount of time elapsed since the time indicated by the master time reference.

9. The system as claimed in claim 1, wherein the gunshot sensor units calibrate local times maintained by the gunshot sensor units based on the timing information.

10. The system as claimed in claim 1, wherein the gunshot sensor units further comprise external clock receivers and antennas, for receiving timing information broadcast from an external source to the gunshot sensor units.

11. A method for detecting gunshots within a premises, the method comprising:
  gunshot sensor units of a gunshot detection system exchanging timing information with other gunshot sensor units over a communication network; and
  the gunshot sensor units detecting gunshots and generating event information for gunshot detection events based on the timing information.

12. The method as claimed in claim 11, further comprising the gunshot sensor units exchanging the timing information with a control panel.

13. The method as claimed in claim 11, further comprising configuring the gunshot sensor units as master and slave nodes, wherein the master node sends the timing information to the slave nodes.

14. The method as claimed in claim 13, further comprising configuring the gunshot sensor units as master and slave nodes based on predetermined priority information.

15. The method as claimed in claim 14, further comprising the gunshot sensor units broadcasting the priority information to the other gunshot sensor units during an initial configuration process and/or after a current master node becomes non-functional.

16. The method as claimed in claim 13, further comprising one of the gunshot sensor units becoming a master node if a current master nodes becomes non-functional.

17. The method as claimed in claim 13, further comprising the master node periodically sending updated timing information to the slave nodes.

18. The method as claimed in claim 13, wherein the timing information includes a master time reference indicating a time, and the event information indicates an amount of time elapsed since the time indicated by the master time reference.

19. The method as claimed in claim 11, further comprising the gunshot sensor units calibrating local times maintained by the gunshot sensor units based on the timing information.

20. The method as claimed in claim 11, further comprising the gunshot sensor units receiving timing information broadcast from an external source via external clock receivers and antennas of the gunshot sensor units.

\* \* \* \* \*